(12) United States Patent
Futami

(10) Patent No.: US 8,480,266 B2
(45) Date of Patent: Jul. 9, 2013

(54) VEHICLE LIGHT UNIT AND VEHICLE LIGHT

(75) Inventor: Takashi Futami, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 329 days.

(21) Appl. No.: 13/042,426

(22) Filed: Mar. 7, 2011

(65) Prior Publication Data

US 2011/0216549 A1  Sep. 8, 2011

(30) Foreign Application Priority Data

Mar. 5, 2010 (JP) ................................ 2010-049248

(51) Int. Cl.
*F21V 7/00* (2006.01)

(52) U.S. Cl.
USPC ........... 362/298; 362/517; 362/518; 362/297; 362/511; 362/346

(58) Field of Classification Search
USPC ................. 362/517, 518, 297, 298, 301, 302, 362/346, 511
See application file for complete search history.

(56) References Cited

U.S. PATENT DOCUMENTS

| | | | |
|---|---|---|---|
| 6,481,130 B1 * | 11/2002 | Wu | 40/546 |
| 7,207,705 B2 * | 4/2007 | Ishida | 362/517 |
| 7,431,481 B2 * | 10/2008 | Stefanov | 362/328 |
| 7,441,928 B2 * | 10/2008 | Futami | 362/298 |
| 7,513,672 B2 * | 4/2009 | Parker | 362/613 |
| 2007/0133211 A1 * | 6/2007 | Yoneda et al. | 362/317 |
| 2008/0273345 A1 * | 11/2008 | Yajima et al. | 362/517 |
| 2009/0109699 A1 * | 4/2009 | Grotsch et al. | 362/555 |
| 2009/0268481 A1 * | 10/2009 | Nishihata | 362/517 |

FOREIGN PATENT DOCUMENTS

JP 2007-287490 A 11/2007

* cited by examiner

*Primary Examiner* — Jong-Suk (James) Lee
*Assistant Examiner* — Bryon T Gyllstrom
(74) *Attorney, Agent, or Firm* — Kenealy Vaidya LLP

(57) ABSTRACT

A vehicle light unit can convert an LED light source to a linear light emitting state and can be incorporated into a vehicle light. The vehicle light unit can include a first to fourth lens part in front of an LED light source. The first to third lens parts can convert the point light source or the LED light source into a linear light emitting portion with improved light utilization efficiency by providing first to fourth total reflection surfaces utilizing internal reflection to the third lens part. The light rays through the linear light emitting portion can be incident on the fourth lens part. The fourth lens part can include a plate-shaped light guiding portion with a plurality of total reflection surfaces on one surface and corresponding lens cut portions on the other opposite surface.

12 Claims, 16 Drawing Sheets

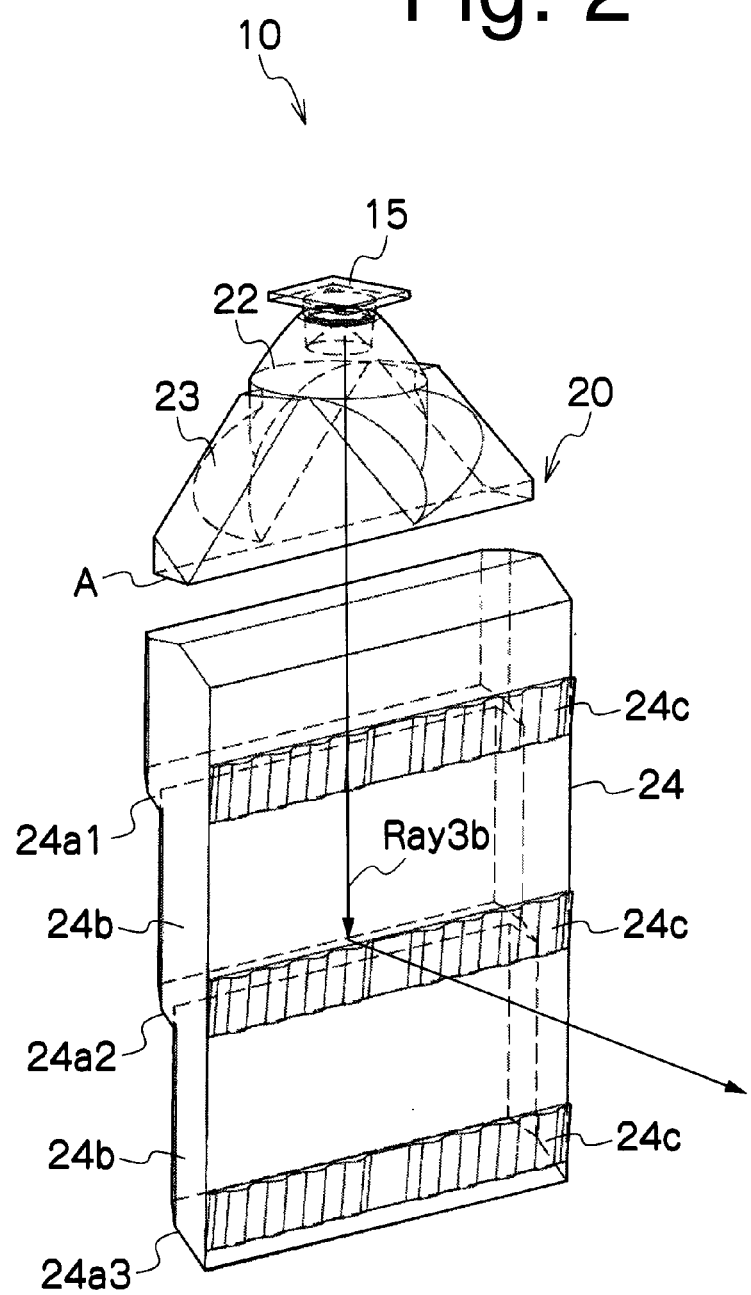

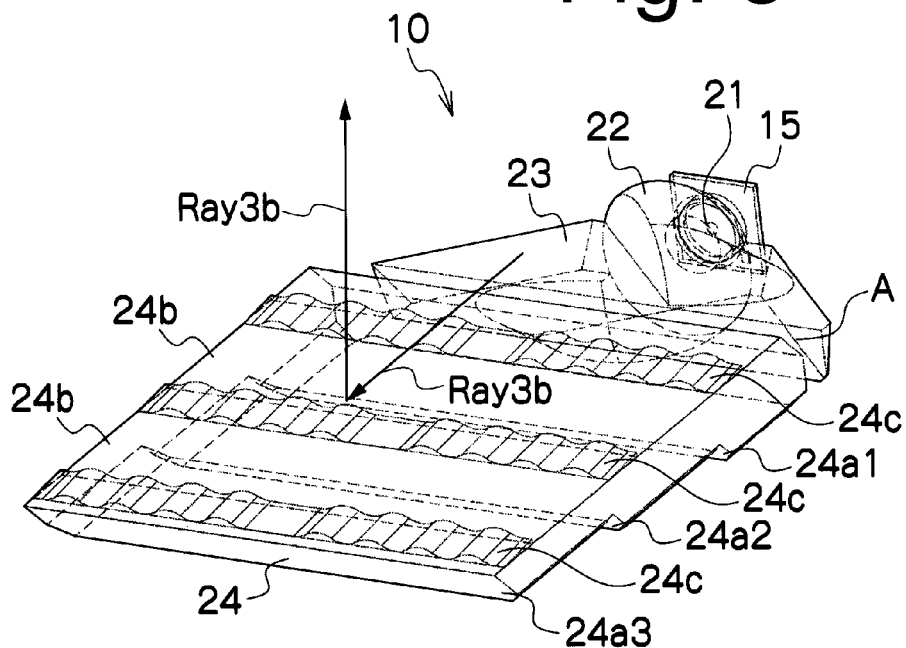
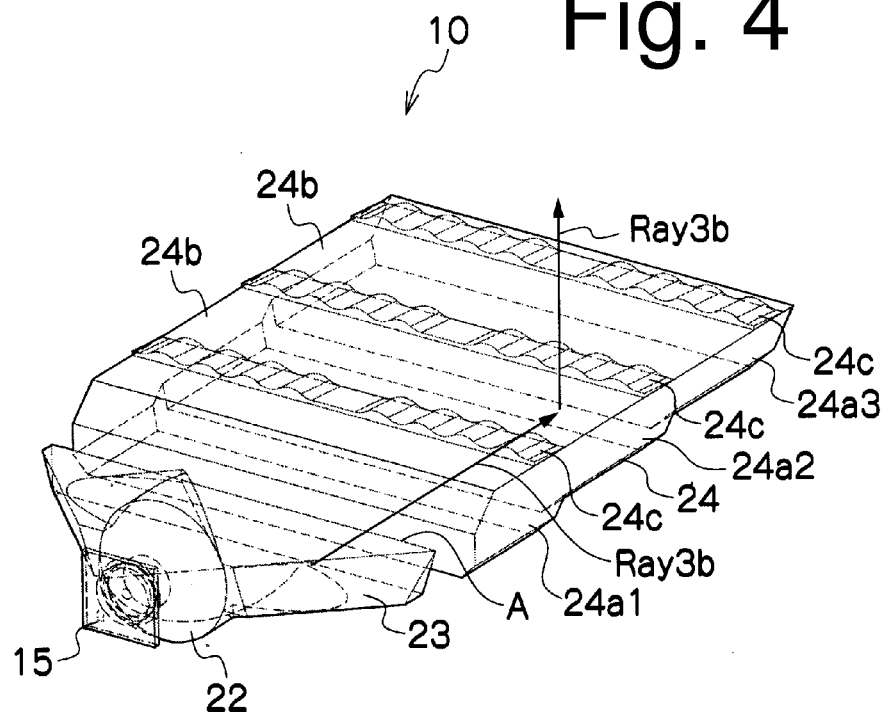

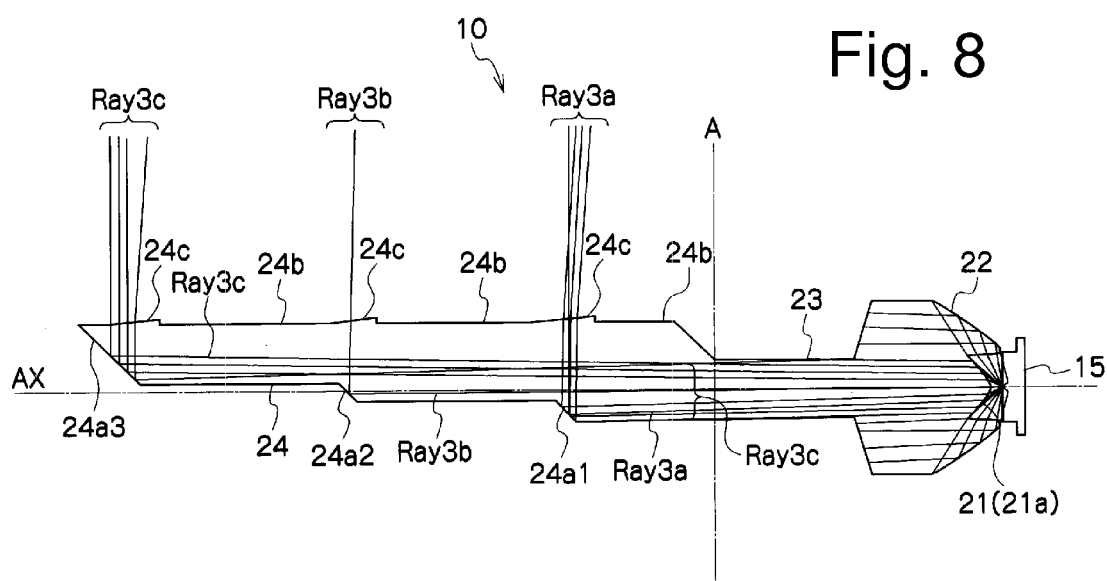

US 8,480,266 B2

VEHICLE LIGHT UNIT AND VEHICLE LIGHT

This application claims the priority benefit under 35 U.S.C. §119 of Japanese Patent Application No. 2010-049248 filed on Mar. 5, 2010, which is hereby incorporated in its entirety by reference.

TECHNICAL FIELD

The presently disclosed subject matter relates to a vehicle light unit, and, in particularly, to a vehicle light unit which is capable of converting an LED light source to a linear light emitting state, and a vehicle light that utilizes the same.

BACKGROUND ART

Conventional vehicle lights include optical systems which are configured such that an LED light source is converted into a laterally long linear light emitting part (see, for example, Japanese Patent Application Laid-Open No. 2007-287490 or corresponding U.S. Pat. No. 7,441,928).

As shown in FIGS. 1A and 1B, a vehicle light 700 described in Japanese Patent Application Laid-Open No. 2007-287490 can be provided with: an LED light source 710; from among the regions produced by dividing the front surface of the LED light source 710 into three regions (an upper region A1, a center region A2, and a lower region A3), a first reflection mirror 721 disposed in the upper region A1; a second reflection mirror 722 disposed on the outside of the first reflection mirror 721; a third reflection mirror 723 disposed in the lower region A3; and a fourth reflection mirror 724 disposed on the outside of the third reflection mirror 723.

According to the vehicle light 700 described in Japanese Patent Application Laid-Open No. 2007-287490 of the aforementioned configuration, the optical paths of light rays L2 from the LED light source 710 which are incident to the first reflection mirror 721 can be changed due to being reflected twice by the first reflection mirror 721 and the second reflection mirror 722, and pass through the right area adjacent to the center region A2 in FIG. 1B. Furthermore, the optical paths of light rays L3 from the LED light source 710 which are incident to the third reflection mirror 723 can be changed due to being reflected twice by the third reflection mirror 723 and the fourth reflection mirror 724, and then pass through the left area adjacent to the center region A2 in FIG. 1B. Due to the light rays L2 and L3 from the LED light source 710 which pass through the respective right and left areas adjacent to the center region A2 after the optical paths thereof have been changed, and the light rays L1 from the LED light source 710 which pass through the center region A2, a laterally long linear light emitting part can be formed, which extends as a whole in one direction (in the lateral left-to-right direction in FIG. 1B).

However, in a vehicle light 700 of the aforementioned configuration, although an LED light source can be converted into a laterally long linear light emitting part, the vehicle light has a disadvantage in that light utilization efficiency is low because the configuration uses mainly light rays of a narrow angle direction with respect to an optical axis from among the light rays emitted from the LED light source 710.

Furthermore, there has also been a disadvantage of further reduced light utilization efficiency as the aforementioned reflection mirrors 721 to 724 which have been subjected to mirror surface processing through sputtering or the like are configured so as to reflect light rays twice and light loss (approximately 30%) may occur as a result of two reflections.

SUMMARY

The presently disclosed subject matter was devised in view of these and other problems and features and in association with the conventional art. According to an aspect of the presently disclosed subject matter, a vehicle light unit is provided that can convert an LED light source into a linear light emitting part, and which can have higher light utilization efficiency compared with conventional units, and a vehicle light using the same.

According to still another aspect of the presently disclosed subject matter, a vehicle light unit can include: an LED light source having an optical axis; and a solid lens body including a first lens part, a second lens part, and a third lens part. In this configuration, the first lens part can be a converging lens part that can be disposed in front of the LED light source and on the optical axis thereof, the converging lens part being capable of collimating light rays emitted from the LED light source in a narrow angle direction with respect to the optical axis so that the light rays can be collimated to the optical axis. The second lens part can be a converging lens part that can be disposed on an outside of the first lens part, the converging lens part being capable of collimating light rays emitted from the LED light source in a wide angle direction with respect to the optical axis so that the light rays can be collimated to the optical axis. The third lens part can be a lens part disposed in front of the first lens part and the second lens part so that the light rays converged by and traveling through the first lens part and the light rays converged by and traveling through the second lens part can be incident on the third lens part. Furthermore, the third lens part can have a rectangular cross section taken along a plane perpendicular to the optical axis, wherein a height of the rectangular cross section can be set to a dimension the same as a diameter of the first lens portion and a width thereof can be set larger than a diameter of the second lens part, and the third lens part can further include a first total reflection surface, a second total reflection surface, a third total reflection surface, and a fourth total reflection surface. The rectangular cross section can extend as a whole in one direction, and can include: a center region where the light rays that are converged by and travel through the first lens part pass through; two first regions disposed on both sides of the center region where some of the light rays from among those light rays that are converged by and travel through the second lens part pass through; and two second regions disposed outside of the two first regions. The first total reflection surface can be disposed at an attitude wherein the first total reflection surface is inclined with respect to the optical axis so that the light rays, which are traveling toward the outside of one long side of the rectangular cross section and which are from among the light rays converged by and travel through the second lens part, are incident to the first total reflection surface and the incident light rays are reflected sideward. The second total reflection surface can be disposed at an attitude wherein the second total reflection surface is inclined with respect to the optical axis so that the reflected light rays from the first total reflection surface can be incident to the second total reflection surface, and the incident light rays can be reflected by the same in a direction parallel to the optical axis to pass through one of the second regions. The third total reflection surface can be disposed at an attitude wherein the third total reflection surface is inclined with respect to the optical axis so that the light rays, which are traveling toward the outside of the other long side of the rectangular cross section and which are from among the light rays converged by and traveling through the second lens part, can be incident to the third total reflection surface. The fourth total reflection surface can be disposed at an attitude wherein the fourth total reflection surface is inclined with respect to the optical axis so that the reflected light rays from the third total reflection surface can be incident to the fourth total reflection surface, and the incident light rays can be reflected in a direction parallel to the optical axis, and pass through the other of the second regions.

In the above configuration, due to the action of the first lens part, the second lens part, and the first through fourth total reflection surfaces, the LED light source can be converted into a linear light emitting state (the linear light emitting part is configured through light rays traveling in a direction parallel to the optical axis and passing through the substantially entire area of the rectangular cross section).

Furthermore, in the above configuration, due to the action of the second lens part, light rays in a wide angle direction with respect to the optical axis from among the light rays emitted from the LED light source can be effectively utilized. As a result, light utilization efficiency can be improved when compared with conventional vehicle lights.

Further, in the above configuration, unlike some conventional vehicle lights which are configured using mirrors that have been subjected to mirror surface processing by means of sputtering or the like, the presently disclosed subject matter can be configured so that light rays travelling within a lens body can be reflected twice by the first through fourth total reflection surfaces with internal reflection (total reflection). Thus, light utilization efficiency can be further improved when compared with certain conventional vehicle lights.

Moreover, in the above configuration due to the action of the first lens part, the second lens part, and the first to fourth total reflection surfaces, the light rays emitted from the LED light source can be converted into light rays traveling in a direction parallel to the optical axis and passing through the substantially entire area of the rectangular cross section (light rays travelling in the same direction for easier control).

In the above configuration, according to still another aspect of the presently disclosed subject matter, the lens body can further include a fourth lens part 24 that is disposed so that the light rays passing through the rectangular cross section can be incident thereon. In a region of the fourth lens part where the light rays passing through the rectangular cross section and travelling through the fourth lens part can be output, a lens cut part can be formed to control the light rays traveling through the fourth lens part so that a predetermined light distribution pattern is formed.

In accordance with the above aspect, the rectangular cross section and the fourth lens part can be configured so as to be integrally connected without having a boundary surface. Accordingly, the vehicle light unit can be configured to have high light utilization efficiency which is capable of allowing light rays traveling in a direction parallel to the optical axis and passing through the rectangular cross section to be incident almost completely on the fourth lens part.

In the above configuration, according to still another aspect of the presently disclosed subject matter, the fourth lens part can be configured by extending the rectangular cross section along the optical axis to be formed as a light-guiding lens having a flat plate shape. The fourth lens part can be configured to include a front surface disposed in parallel with the optical axis, a rear surface disposed opposite to the front surface, a plurality of total reflection surfaces formed in the rear surface along the optical axis, and a transparent lens part disposed between adjacent ones of the plurality of the total reflection surfaces. The plurality of total reflection surfaces can be disposed at an attitude wherein the total reflection surfaces are inclined at an angle of approximately 45° with respect to the optical axis so that part of the light rays passing through the rectangular cross section and traveling through the fourth lens part are caused to be incident on the total reflection surfaces, and the incident light rays are caused to be reflected toward the surface of the fourth lens part. In a region of the fourth lens part where the light rays reflected from the plurality of total reflection surfaces can be output, the lens cut part can be formed to control the light rays traveling through the fourth lens part so that the predetermined light distribution pattern is formed.

In accordance with the above aspect, the fourth lens part can be configured so that the regions in which lens cut parts are formed (in other words, the regions from which light rays, the optical paths thereof having been changed by a plurality of total reflection surfaces, are output and emitted) are disposed alternately with transparent lens parts. Thus, the vehicle light unit can be configured to have a novel appearance which emits light rays in a state as if the regions in which the lens cut parts are formed are suspended in midair.

Further, in accordance with the above aspect, the vehicle light unit can have a novel appearance, wherein the portions behind the unit (for example, an extension or housing) can be seen through the transparent lens part.

Further, in accordance with the above aspect, the vehicle light unit can form a predetermined light distribution pattern, through the light rays whose optical paths have been changed by the plurality of total reflection surfaces and which are output as controlled light from the regions of the surface of the fourth lens part in which the lens cut parts are formed.

Thus, the vehicle light unit in accordance with the above aspect can be configured to form a predetermined light distribution pattern while also realizing a novel appearance.

In the above configuration, according to further still another aspect of the presently disclosed subject matter, surface regions corresponding to the plurality of total reflection surfaces can be subjected to mirror surface processing.

In accordance with the above aspect, the light utilization efficiency can be improved, since, due to the action of the surface region which has been subjected to mirror surface processing, it is possible to prevent some of the light rays whose incident angle does not fall within an angle range for total reflection from escaping outside of the plurality of total reflection surfaces.

According to further still another aspect of the presently disclosed subject matter, a vehicle light can include a plurality of the vehicle light units configured as described above in any one of the aspects, wherein the fourth lens parts can have respective surfaces facing the same direction and be disposed along a predetermined line.

In accordance with the above aspect, the vehicle light can have a novel appearance, wherein the vehicle light units can be disposed along a predetermined line (for example, a vehicle body line that goes around from the vehicle rear end right side or left side along the right side surface or left side surface), and can emit light in a state as if the regions in which lens cut parts are formed are suspended in midair.

Further, in accordance with the above aspect, the vehicle light can have a novel appearance, wherein the portions behind the unit (for example, an extension or housing) can be seen through the transparent lens part.

Further, in accordance with the above aspect, the vehicle light can form a predetermined light distribution pattern which satisfies the luminous intensity level required by a certain law, by means of light rays that are emitted from respective vehicle light units (light rays whose optical paths have been changed by a plurality of total reflection surfaces and which are output as controlled light from the regions of the surface of the fourth lens part in which the lens cut parts are formed).

Thus, in accordance with the above aspect, the vehicle light can form a predetermined light distribution pattern which satisfies the luminous intensity level required by a certain law, while also realizing a novel appearance.

According to further still another aspect of the presently disclosed subject matter, a vehicle light can include a plurality of vehicle light units configured as described above with respect to any one of the above aspects, the plurality of vehicle light units being disposed along an upper line, with the surfaces of the fourth lens parts facing the same direction, the fourth lens parts extending downward; and another plurality of the vehicle light units configured as described above in any one of the above aspects, the plurality of vehicle light units being disposed along a lower line, with the surfaces of the fourth lens parts facing the same direction, the fourth lens parts extending upward. At least part of the regions, in which the lens cut parts 24c are formed, of the fourth lens parts of the vehicle light units disposed along the lower line can be positioned at the rear of transparent lens parts of the fourth lens parts of the vehicle light units disposed along the upper line.

In accordance with the above aspect, the vehicle light can have a novel appearance (layered light emission), wherein regions which are positioned on the rear side of a front-side vehicle light unit and in which the lens cut parts are formed (in other words, the regions from which light rays, the optical paths thereof having been changed by a plurality of total reflection surfaces, are output and emitted) can be seen through a transparent lens part of the front-side vehicle light unit.

Further, in accordance with the above aspect, the vehicle light can have a novel appearance that has a sense of depth and spatiality, wherein the regions of the fourth lens part in which the lens cut parts are formed (in other words, the regions from which the light rays, the optical path thereof having been changed by the plurality of total reflection surfaces, are output and emitted) can be evenly distributed.

Further, in accordance with the above aspect, the vehicle light can form a predetermined light distribution pattern which satisfies the luminous intensity level required by a certain law, through light rays that are emitted from respective vehicle light units (light rays whose optical paths have been changed by the plurality of total reflection surfaces and which are output as controlled light from the regions of the surfaces of the fourth lens parts in which the lens cut parts are formed). It should be noted that, since the light rays, which are output as controlled light from the regions of the surfaces of the fourth lens parts in which the lens cut parts are formed, can pass through the corresponding transparent lens parts, there is almost no adverse effect on light distribution.

Thus, in accordance with the above aspect, the vehicle light can form a predetermined light distribution pattern which satisfies the luminous intensity level required by a certain law, while also realizing a novel appearance.

According to still another aspect of the presently disclosed subject matter, a vehicle light can include a box-shaped reflector having an opening in the front surface thereof; the vehicle light according to any of the above aspects disposed inside the box-shaped reflector; and an additional light source provided inside the box-shaped reflector.

In accordance with the above aspect, the vehicle light can have a novel appearance and a high quality feel not heretofore seen in conventional vehicle lights, wherein light can be emitted in a state as if regions in which lens cut parts are formed are suspended in midair, while soft indirect light can be illuminated on the rear side of the vehicle light within the box-shaped reflector.

Further, in accordance with the above aspect, the vehicle light can have a novel appearance, wherein the inner surface of the box-shaped reflector on the rear side of the vehicle light is visible through the transparent lens part when not being lit, while the reflector can be seen as if it emits light when being lit (light emitting points appear in positions that are shifted forward, backward, leftward, rightward, upward, and downward with respect to each other).

According to still another aspect of the presently disclosed subject matter, a vehicle light can include: a box-shaped housing which has an opening formed in the front surface thereof; a plurality of the vehicle light units configured as described above in any one of the aspects, the plurality of vehicle light units being disposed along an upper line, with the surfaces of the fourth lens parts thereof facing the same direction, the fourth lens parts extending downward; and another plurality of the vehicle light units configured as described above in any one of the aspects, the plurality of vehicle light units being disposed along a lower line, with the surfaces of the fourth lens parts facing the same direction, the fourth lens parts extending upward. Furthermore, on the upper surface of the housing, a plurality of openings can be formed in which the respective fourth lens parts of the plurality of vehicle light units disposed along the upper line can be inserted. On the lower surface of the housing, a plurality of openings are formed in which the respective fourth lens parts of the plurality of vehicle light units disposed along the lower line can be inserted. Then, the respective fourth lens parts of the plurality of vehicle light units disposed along the upper line can be inserted in the plurality of openings formed on the upper surface of the housing and project into the housing. Furthermore, the respective fourth lens parts of the plurality of vehicle light units disposed along the lower line can be inserted in the plurality of openings formed on the lower surface of the housing and project into the housing. Additionally, at least part of the regions, in which the lens cut parts are formed, of the projecting fourth lens parts along the lower line can be positioned at the rear of transparent lens parts of the fourth lens parts projecting into the housing inserted in the plurality of openings formed on the upper surface of the housing.

In accordance with the above aspect, the vehicle light can be configured to have an enclosed structure in which the components other than the fourth lens parts are covered with the housing. Accordingly, the LED light sources cannot directly be observed from outside.

Further, in accordance with the above aspect, the vehicle light can have a novel appearance (layered light emission), wherein regions which are positioned on the rear side of a front-side vehicle light unit and in which the lens cut parts are formed (in other words, the regions from which light rays, the optical paths thereof having been changed by a plurality of total reflection surfaces, are output and emitted) can be seen through a transparent lens part of the front-side vehicle light unit.

Further, in accordance with the above aspect, the vehicle light can have a novel appearance that has a sense of depth and spatiality, wherein the regions of the fourth lens part in which the lens cut parts are formed (in other words, the regions from which the light rays, the optical path thereof having been changed by the plurality of total reflection surfaces, are output and emitted) can be evenly distributed.

Further, in accordance with the above aspect, the vehicle light can form a predetermined light distribution pattern which satisfies the luminous intensity level required by a certain law, by means of light rays that are emitted from respective vehicle light units (light rays whose optical paths have been changed by the plurality of total reflection surfaces and which are output as controlled light from the regions of the surfaces of the fourth lens parts in which the lens cut parts are formed). It should be noted that, since the light rays, which are output as controlled light from the regions of the surfaces of the fourth lens parts in which the lens cut parts are formed, can pass through the corresponding transparent lens parts, there is almost no adverse effect on light distribution.

Thus, in accordance with the above aspect, the vehicle can form a predetermined light distribution pattern which satisfies the luminous intensity level required by a certain law, while also realizing a novel appearance (layered light emission), and without the LED light sources and the like component being directly observed from outside.

BRIEF DESCRIPTION OF DRAWINGS

These and other characteristics, features, and advantages of the presently disclosed subject matter will become clear from the following description with reference to the accompanying drawings, wherein:

FIG. 2 is a perspective view illustrating a vehicle light unit 10 made in accordance with principles of the presently disclosed subject matter when viewed from its main surface (where lens cut parts 24c are formed);

FIG. 3 is a perspective view of the vehicle light unit 10 of the same exemplary embodiment when viewed from the tip end side of a fourth lens part 24;

FIG. 4 is a perspective view of the vehicle light unit 10 of the same exemplary embodiment when viewed from a third lens part 23;

FIG. 8 is a vertical cross sectional view of the vehicle light unit 10 of FIGS. 2 to 4;

DESCRIPTION OF EXEMPLARY EMBODIMENTS

Figure 1A:
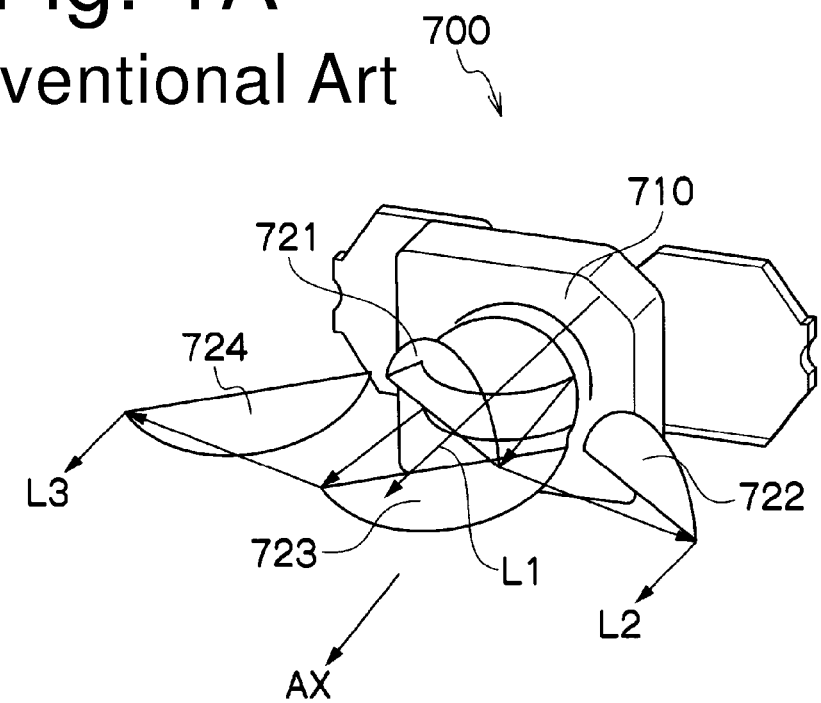
FIG. 1A is a perspective view illustrating a conventional vehicle light 700 and FIG. 1B is a front view of the conventional vehicle light 700.
Figure 1B:
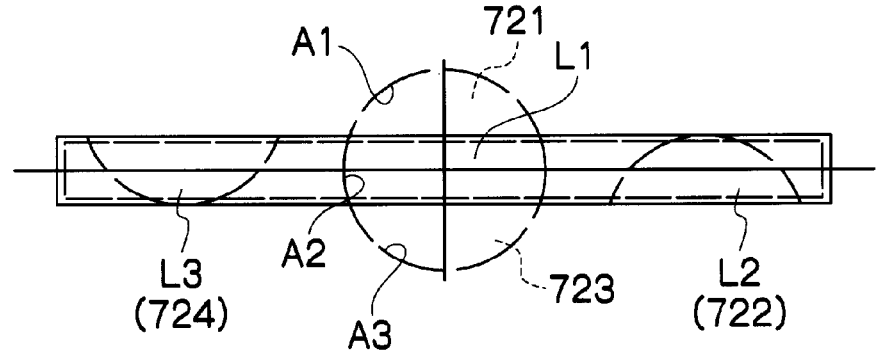

A description will now be made below to vehicle lights of the presently disclosed subject matter with reference to the accompanying drawings and in accordance with exemplary embodiments.

It should be appreciated that the following descriptions will be given with directions of "up," "down (low)," "front," "back (rear)," "left," and "right," in some cases and the directions will be based on the directions when the vehicle light is installed on a vehicle body. This means the directions are given from a driver's perspective.

A vehicle light unit 10 according to the present exemplary embodiment of the presently disclosed subject matter can, for example, be applied to signal lights for vehicles (such as a tail lamp, a stop lamp, a turn signal lamp, a daytime running lamp, a position lamp, and the like). The vehicle light unit 10 can include an LED light source 15, a lens body 20, and the like parts, as shown in FIGS. 2 to 4.

The LED light source 15 can be, for example, a surface light source which can emit pseudo white light rays through the mixture of blue light rays and yellow light rays. The LED light source 15 can include a light source package on which a plurality of light emitting chips (can emit blue light rays) are mounted, and a fluorescent material (can emit yellow light rays) which can emit light rays due to being excited by the light rays from the plurality of light emitting chips at their luminescence wavelengths, and which is applied or adhered to the light source package. A chip-type LED light source can be used in the present exemplary embodiment with the light source not having directivity in terms of light output intensity.

The lens body 20 can include lens parts which can include a first lens part 21, a second lens part 22, and a third lens part 23, and can convert light rays from the LED light source 15 into a linear light emitting state, and a fourth lens part 24 on which the light rays in the converted linear light state can be incident. The first through fourth lens parts 21 to 24 can be integrally formed by injection molding of a transparent resin such as acrylic or polycarbonate resin. It should be noted that, in FIGS. 2 to 4, the first through third lens parts 21 to 23 and the fourth lens part 24 are illustrated separately for convenience of description.

Figure 5:
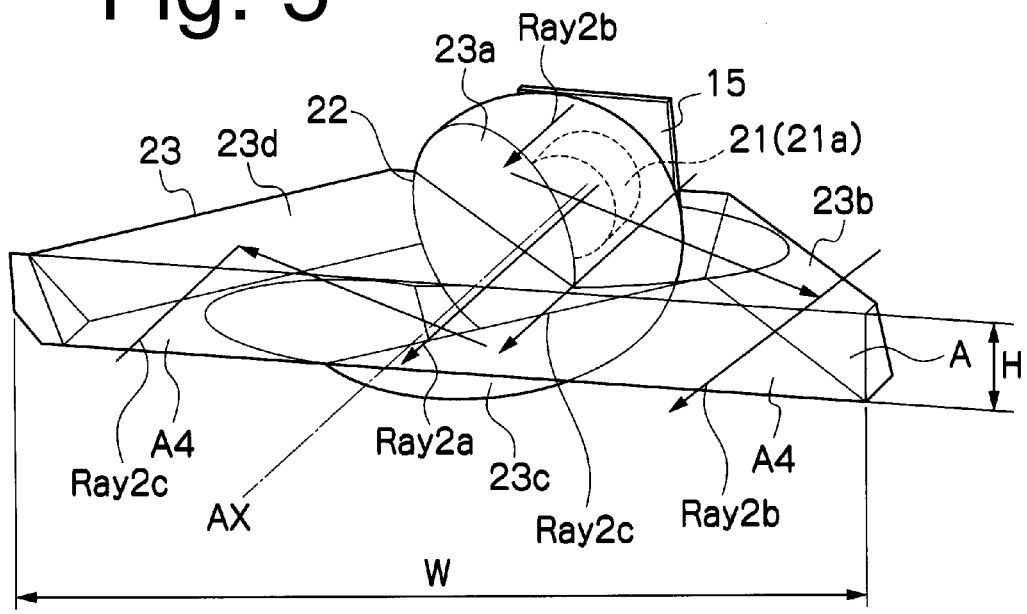
FIG. 5 is a perspective view of first to third lens parts 21 to 23 of the vehicle light unit 10 of FIGS. 2 to 4.
Figure 6:
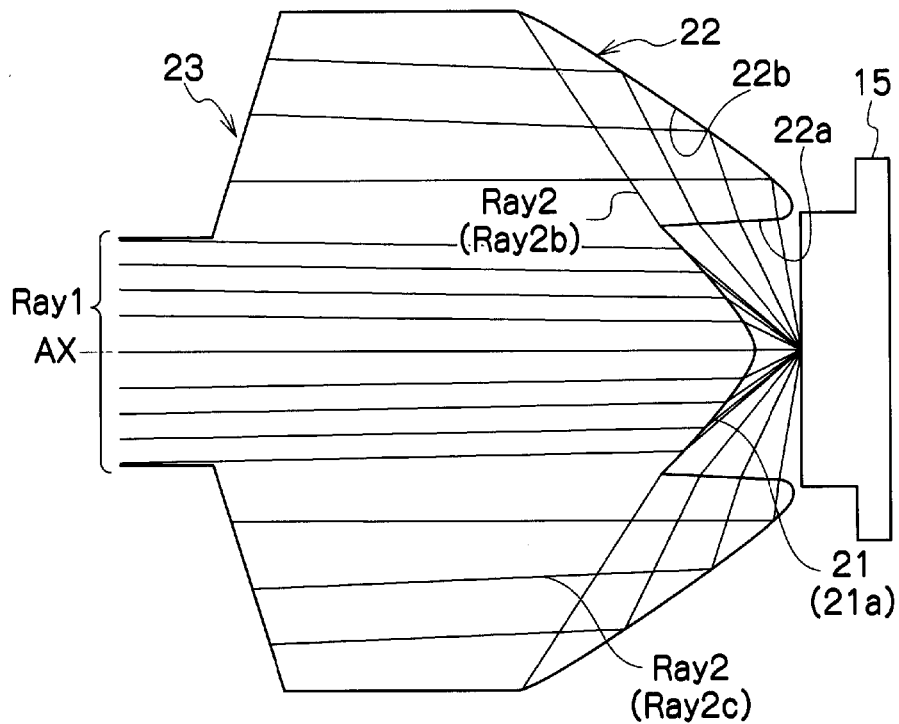
FIG. 6 is a vertical cross sectional view of the first to third lens parts 21 to 23 of the vehicle light unit 10 of FIGS. 2 to 4.

As shown in FIGS. 5 and 6, the first lens part 21 can be disposed in front of the LED light source 15 and on an optical axis AX thereof.

The first lens part 21 can be a converging lens part for converging, from among the light rays emitted from the LED light source 15, light rays Ray 1 in a narrow angle direction with respect to the optical axis AX into light rays that are parallel to the optical axis AX, and can include a first light incident surface 21a.

The first light incident surface 21a can be disposed in front of the LED light source 15 and on the optical axis AX so that, from among the light rays emitted from the LED light source 15, the light rays Ray 1 in the narrow angle direction with respect to the optical axis AX can be incident to the first light incident surface 21a.

The first light incident surface 21a can be configured as a convex lens surface (for example, lens diameter: φ3) of a convex surface on the side of the LED light source 15, in order to converge, from among the light rays emitted from the LED light source 15, the light rays Ray 1 in the narrow angle direction with respect to the optical axis AX into light rays that are parallel to the optical axis AX (see FIG. 6).

According to the first lens part 21 of the aforementioned configuration, as shown in FIG. 6, from among the light rays emitted from the LED light source 15, the light rays Ray 1 in the narrow angle direction with respect to the optical axis AX can enter the first lens part 21 through the first light incident surface 21a while being refracted. Then, the light rays Ray 1 can be converged into light rays that are parallel to the optical axis AX (parallel light rays within a circular region A1 in the front view; see FIG. 7) and travel within the first lens part 21 (see FIG. 6).

As shown in FIGS. 5 and 6, the second lens part 22 can be disposed on the outside of the first lens part 21.

The second lens part 22 can be a converging lens part (for example, lens diameter: φ9) which converges, from among the light rays emitted from the LED light source 15, the light rays in a wide angle direction with respect to the optical axis AX (in other words, the light rays directed toward the outside of the first lens part 21 rather than being incident on the first lens part 21; see reference numeral "Ray 2" in FIG. 6) into light rays that are parallel to the optical axis AX. Herein, the second lens part 22 can include a second light incident surface 22a and a total reflection surface 22b.

The second light incident surface 22a can be configured as a lens surface having a vertical wall shape (cylindrical shape) extending from the periphery of the first light incident surface 21a toward the LED light source 15 so that light rays Ray 2 in the wide angle direction with respect to the optical axis AX, from among the light rays emitted from the LED light source 15, can be incident on the second light incident surface 22a.

The total reflection surface 22b can be disposed on the outside of the second light incident surface 22a so that the light rays Ray 2 which enter the second lens part 22 through the LED light source 15 while being refracted, can be incident on the total reflection surface 22b.

The total reflection surface 22b can be configured so as to totally reflect and converge the light rays Ray 2 from the LED light source 15 which enter the second lens part 22 through the second light incident surface 22a while being refracted, into light rays that are parallel to the in the direction of the optical axis AX. Accordingly, the total reflection surface 22b can be configured as a revolved parabolic reflection surface having a focal point set to the intersection (not shown) of the extended lines of the group of light rays Ray 2 from the LED light source 15 which enter the second lens part 22 through the second light incident surface 21a while being refracted.

According to the second lens part 22 of the aforementioned configuration, as shown in FIG. 6, the light rays Ray 2 in the wide angle direction with respect to the optical axis AX, from among the light rays emitted from the LED light source 15, can enter the second lens part 22 through the second light incident surface 22a while being refracted. Then the light rays Ray 2 can be converged by the action of the total reflection surface 22b into light rays that are parallel to the optical axis AX (parallel light rays within a circular region A2 in the front view; see FIG. 7) and travel within the second lens part 22 (see FIG. 6).

Figure 7:
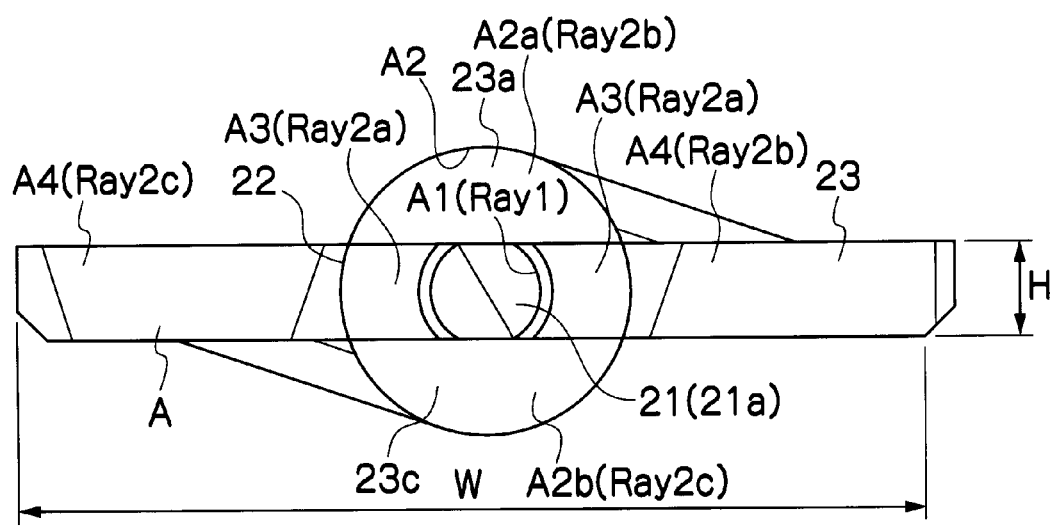
FIG. 7 is a top view of the first to third lens parts 21 to 23 of the vehicle light unit 10 of FIGS. 2 to 4.

As shown in FIGS. 5 and 6, the third lens part 23 can be disposed in front of the first lens part 21 and the second lens part 22 so that light rays Ray 1 and Ray 2 that are parallel to the optical axis AX and can travel within the first lens part 21 and the second lens part 22 (parallel light within the circular region A1 and the circular region A2 on the outside thereof in the front view; see FIG. 7) can be incident on the third lens part 23.

As shown in FIGS. 5 and 7, the third lens part 23 can include a rectangular cross section A (the section that appears when the third lens part 23 is cut along a plane perpendicular to the optical axis AX at its farther side from the light source 15). Herein, the rectangular cross section A can be configured to have a height H which is approximately the same as the diameter of the first lens part 21 (for example, height H: 3 mm), and a width W which is greater than the diameter of the second lens part 22 (for example, width W: 27 mm).

The rectangular cross section A can appear on the optical axis AX so that the light rays Ray 1 traveling within the first lens part 21 pass through the center circular region A1 of the rectangular cross section A (see FIG. 7).

As is shown in FIG. 7, the rectangular cross section A can extend as a whole in one direction. The rectangular cross section A can include: a center region A1 where the light rays Ray 1, converged by the first lens part 21 and traveling within the first lens part 21, pass through; two first regions A3 on both sides of the center region A1 where some of the light rays Ray 2a from among the light rays Ray 2 converged by the second lens part 22 and traveling within the second lens part 22, pass through; and two second regions A4 disposed outside of the two first regions A3.

Light rays Ray 2b and Ray 2c, which are from among the light rays Ray 2 traveling within the second lens part 22 and which do not pass through the rectangular cross section A, travel toward a semicircular region A2a on the outside of one long side of the rectangular cross section A, and toward a semicircular region A2b on the outside of the other long side of the rectangular cross section A, as viewed from the front (see FIG. 7).

The third lens part 23 can be configured so as to change the optical paths of the light rays Ray 2b and Ray 2c travelling toward the semicircular regions A2a and A2b outside the rectangular cross section A, and to cause the light rays Ray 2b and Ray 2c to pass through the second regions A4 of the rectangular cross section A. Accordingly, the third lens part 23, as shown in FIG. 5, can include a configuration (composed of a first total reflection surface 23a and a second total reflection 23b) to change the optical path of the light rays Ray 2b and a configuration (composed of a third total reflection surface 23c and a fourth total reflection surface 23d) to change the optical path of the light rays Ray 2c.

The first total reflection surface 23a can be disposed in the traveling direction of the light rays Ray 2b, so that the light rays Ray 2b which are travelling toward the outside of one long side of the rectangular cross section A (the semicircular region A2a in the upper side in FIG. 7), and which are from among the light rays Ray 2 converged by the second lens part 22 and traveling within the second lens part 22, can be incident on the first total reflection surface 23a.

The first total reflection surface 23a can be disposed at an attitude wherein the first total reflection surface 23a is inclined at an angle of approximately 45° with respect to the optical axis AX (see FIG. 5) so that the incident light rays Ray 2b can be reflected toward the side (the right side in FIG. 5).

The second total reflection surface 23b can be configured such that the reflected light rays Ray 2b from the first total reflection surface 23a can be incident on the second total reflection surface 23b, and the incident light rays Ray 2b can be reflected by the same in the direction parallel to the optical axis AX to pass through one of the second regions A4 (the second region A4 on the right in FIG. 7) of the rectangular cross section A. In order to do so, the second total reflection surface 23b can be disposed at an attitude wherein the second total reflection surface 23b is inclined at an angle of approximately 45° with respect to the optical axis AX (see FIG. 5), at the same height as the right second region A4 in FIG. 5 (the right second region A4 in FIG. 7).

The third total reflection surface 23c can be disposed in the traveling direction of the light rays Ray 2c so that the light rays Ray 2c, which are traveling toward the outside of the other long side of the rectangular cross section A (the semicircular region A2b in the lower side in FIG. 7), and which are from among the light rays Ray 2 converged by the second lens part 22 and traveling within the second lens part 22, can be incident on the third total reflection surface 23c.

The third total reflection surface 23c can be disposed at an attitude wherein the third total reflection surface 23c is inclined at an angle of approximately 45° with respect to the optical axis AX (see FIG. 5) so that the incident light rays Ray 2c can be reflected toward the side (the left side in FIG. 5).

The fourth total reflection surface 23d can be configured such that the reflected light rays Ray 2c from the third total reflection surface 23c can be incident on the fourth total reflection surface 23d, and the incident light rays Ray 2c can be reflected in the direction parallel to the optical axis AX, and pass through the other second region A4 (the second region A4 on the left in FIG. 7) of the rectangular cross section A. In order to do so, the fourth total reflection surface 23d can be disposed at an attitude wherein the fourth total reflection surface 23d is inclined at an angle of approximately 45° with respect to the optical axis AX (see FIG. 5), at the same height as the left second region A4 in FIG. 5 (the left second region A4 in FIG. 7).

For example, a planar total reflection surface can be used as the first to fourth total reflection surfaces 23a to 23d.

In the configuration including the LED light source 15 and the first to third lens parts 21 to 23, due to the action of the first lens part 21, the second lens part 22, and the first to fourth total reflection surfaces 23a to 23d, the LED light source 15 can be converted into a linear light emitting part (the linear light emitting part is formed through the converged light rays Ray 1 and Ray 2a to Ray 2c, which travel in the direction parallel to the optical axis AX, passing through the substantially entire area of the rectangular cross section A). For example, in the case where the light emitting size of the center circular region A1 has an aspect ratio of 1:1, the light emitting part can be converted into a linear light emitting part with an aspect ratio of approximately 1:9.

Furthermore, in the aforementioned configuration including the LED light source 15 and the first to third lens parts 21 to 23, due to the action of the second lens part 22, the light rays Ray 2 in the wide angle direction with respect to the optical axis AX can be used from among the light rays emitted from the LED light source 15. As a result, light utilization efficiency can be improved when compared with conventional vehicle lights.

Additionally, in the aforementioned configuration including the LED light source 15 and the first to third lens parts 21 to 23, unlike conventional vehicle lights which are configured to utilize mirrors that have been subjected to mirror surface processing through sputtering or the like, the vehicle light can be configured so that the light rays Ray 2b and Ray 2c travelling within the lens body can be reflected twice by the first to fourth total reflection surfaces 23a to 23d which perform internal reflection (total reflection). Thus, light utilization efficiency can be further improved when compared with conventional vehicle lights.

Moreover, in the aforementioned configuration including the LED light source 15 and the first to third lens parts 21 to 23, due to the action of the first lens part 21, the second lens part 22, and the first to fourth total reflection surfaces 23a to 23d, the light rays emitted from the LED light source 15 can be converted into converged light rays Ray 1 and Ray 2a to Ray 2c traveling in the direction parallel to the optical axis AX (light rays travelling in the same direction for easier control; hereinafter collectively referred to as light rays Ray 3) and passing through the substantially entire area of a rectangular cross section A.

As shown in FIGS. 2 to 4, the fourth lens part 24 can be configured by extending the rectangular cross section A along the optical axis AX to form a light-guiding lens having a flat plate shape so that the converged light rays Ray 3 passing through the rectangular cross section A of the third lens part 23 can be incident to the fourth lens part 24.

As shown in FIG. 8, the fourth lens part 24 can change the optical paths (approximately change of 90°) of light rays (Ray 1 and Ray 2a to Ray 2c; collectively referred to as Ray 3), which pass through the rectangular cross section A and travel within the fourth lens part 24, and extract (output) the light rays from the surface of the fourth lens part 24. In order to do so, the fourth lens part 24 can include three total refection surfaces 24a1 to 24a3 disposed on the rear surface of the fourth lens part 24 along the optical axis AX, and a transparent lens part 24b (lens part 24b whose front surface and rear surface are parallel to each other) between adjacent ones of the total reflection surfaces 24a1 to 24a3. It should be noted that the number of total reflection surfaces that can be disposed on the rear surface of the fourth lens part 24 is not limited to three; there can be one, two, or four or more.

The total reflection surfaces 24a1 to 24a3 can be disposed at an attitude wherein the total reflection surfaces 24a1 to 24a3 are inclined at an angle of approximately 45° with respect to the optical axis AX. This attitude causes some of the light rays Ray 3 passing through the rectangular cross section A and traveling within the fourth lens part 24 to be incident on the total reflection surfaces 24a1 to 24a3, and the incident light rays to be reflected toward the surface of the fourth lens part 24. For example, the total reflection surfaces 24a1 to 24a3 can be disposed at a total of three positions while there is a difference of 1 mm between adjacent ones of the positions in the thickness direction (see FIG. 8).

The total reflection surfaces 24a1 to 24a3 can be configured as reflection surfaces having a flat plate shape which extend in the width direction (longitudinal direction) of a rectangular cross section A3 (see FIGS. 2 to 4). Surface regions corresponding to the total reflection surfaces 24a1 to 24a3 can be subjected to mirror surface processing through aluminum sputtering or the like. In this way, light utilization efficiency can be improved, since, due to the action of the surface regions which have been subjected to mirror surface processing, some of the light rays Ray 3 whose incident angle does not fall within an angle range for total reflection can be prevented from escaping outside of the total reflection surfaces 24a1 to 24a3.

The total reflection surface 24a1 can be disposed in the traveling direction of light rays Ray 3a so that the light rays Ray 3a which are from among the light rays Ray 3 passing through the rectangular cross section A, and traveling close to the rear surface of the fourth lens part 24, can be incident on the total reflection surface 24a1.

The total reflection surface 24a2 can be disposed in the traveling direction of the light rays Ray 3b so that the light rays Ray 3b which are from among the light rays Ray 3 passing through the rectangular cross section A, and traveling in the vicinity of the optical axis AX, can be incident on the total reflection surface 24a2.

The total reflection surface 24a3 can be disposed in the travelling direction of the light rays Ray 3c so that the light rays Ray 3c which are from among the light rays Ray 3 passing through the rectangular cross section A, and travelling close to the front surface of the fourth lens part 24, can be incident on the total reflection surface 24a3.

In order to form a predetermined light distribution pattern by controlling the reflected light rays Ray 3a to Ray 3c, line-shaped lens cut parts 24c (for example, line width: 3 mm) which extend in the width direction (longitudinal direction) of the rectangular cross section A3 can be formed in regions of the front surface of the fourth lens part 24 where the reflected light rays Ray 3a to Ray 3c from the total reflection surfaces 24a1 to 24a3 and whose optical paths have been changed, can be output (see FIG. 8 and FIGS. 2 to 4). For example, a prism which creates spread in the left-to-right direction, a diffusion R cut, or the like, can be utilized as the lens cut part 24c.

In the aforementioned configuration of the vehicle light unit 10, regions to which the lens cut parts 24c are formed (in other words, the regions from which the light rays Ray 3, the optical path thereof having been changed by the total reflection surfaces 24a1 to 24a3, are output and emitted) can be disposed alternately with the transparent lens parts 24b. Thus, a vehicle light unit can be configured to have a novel appearance and emit light in a state as if the regions in which the lens cut parts 24c are formed are suspended in midair.

Further, in the aforementioned configuration, the vehicle light unit 10 can have a novel appearance, wherein the portions behind the unit (for example, an extension or housing) can be seen through the transparent lens part 24b.

Further, in the aforementioned configuration, the vehicle light unit 10 can form a predetermined light distribution pattern through light rays Ray 3 whose optical paths have been changed by the total reflection surfaces 24a1 to 24a3 and which are output as controlled light rays from the regions of the surface of the fourth lens part 24 in which the lens cut parts 24c are formed.

Thus, in the aforementioned configuration, the vehicle light unit 10 can form a predetermined light distribution pattern while also realizing a novel appearance.

Moreover, in the aforementioned configuration of the vehicle light unit 10, since the rectangular cross section A and the fourth lens part 24 can be configured so as to be integrally connected without having a boundary surface (see FIG. 8), the vehicle light unit 10 can have high light utilization efficiency which is capable of causing the light rays Ray 3 traveling in the direction parallel to the optical axis AX and passing through the rectangular cross section A to be incident almost completely on the fourth lens part 24.

Additionally, in the aforementioned configuration, since the thicker portion of the lens body 20 can be the second lens part 22 (9 mm), the vehicle light unit 10 can use the lens body 20 formed requiring an additional few minutes during the injection molding of a resin, without causing a substantial cost increase.

A vehicle light 100 configured using a plurality of vehicle light units 10 will now be described.

Figure 9A:
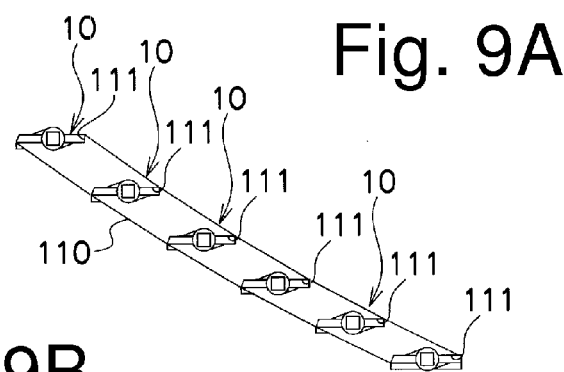
FIGS. 9A, 9B, and 9C are a top view, a front view and a side view of a vehicle light 100 configured by utilizing the vehicle light units 10.
Figure 9B:
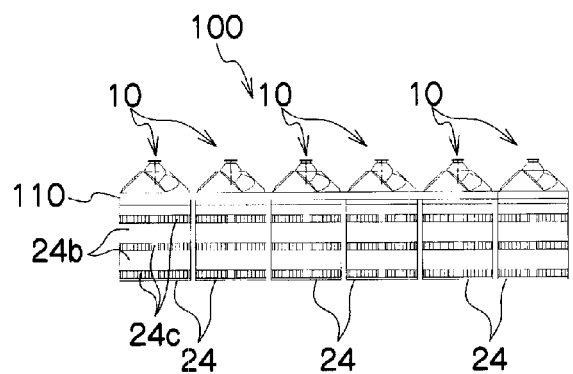
Figure 9C:
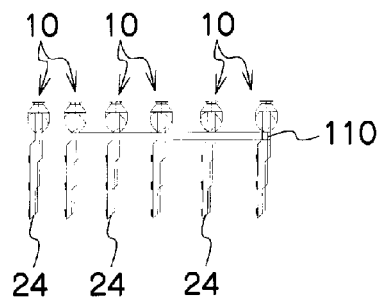
Figure 10:
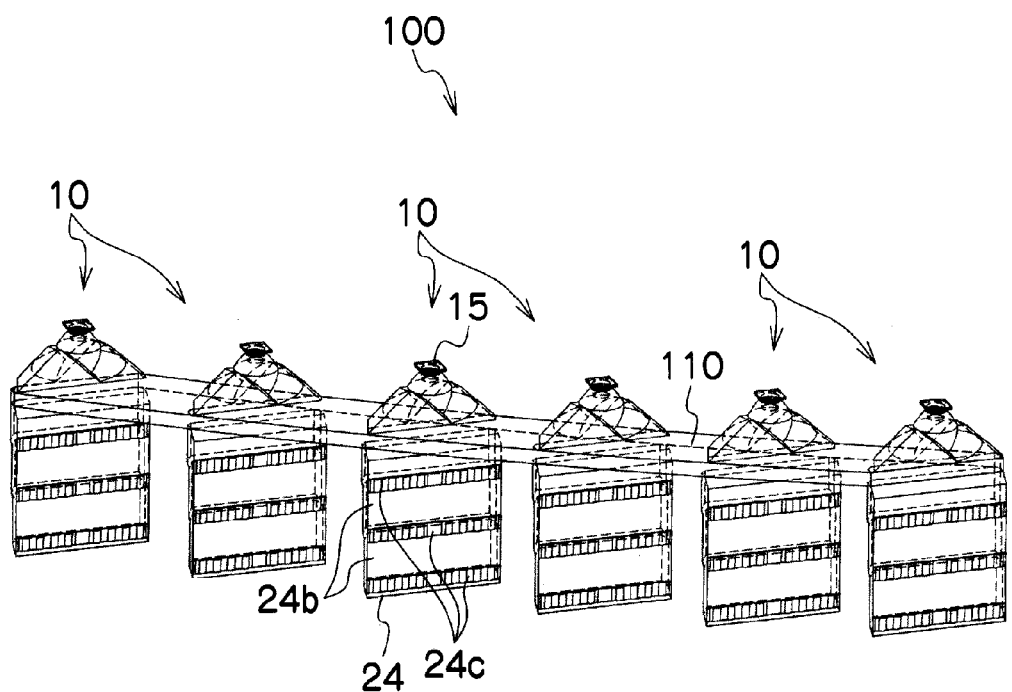
FIG. 10 is a perspective view illustrating a vehicle light 100 configured to utilize the vehicle light units 10 of FIGS. 2 to 4.

The vehicle light 100 of the first example configuration, as shown in FIGS. 9A to 9B and FIG. 10, can include: a plurality of vehicle light units 10 which are disposed along a predetermined line; and a support member 110 to support the plurality of vehicle light units 10. The predetermine line can be a vehicle body line that goes around from the vehicle rear end right side or left side along the right side surface or left side surface. The plurality of vehicle light units 10 can be configured such that the surfaces of the fourth lens parts 24 (the surfaces in which the lens cut parts 24c are formed) face the same direction. The plurality of vehicle light units 10, for example, can be supported by being inserted into rectangular openings 111 formed in the support member 110, in a state wherein the fourth lens parts 24 project from the lower surface of the support member 110.

In the aforementioned configuration, the vehicle light 100 can have a novel appearance (layered light emission) wherein the vehicle light units 10 are disposed along a predetermined line and emit light in a state as if the regions in which the lens cut parts 24c are formed are suspended in midair.

Further, in the aforementioned configuration, the vehicle light 100 can have a novel appearance, wherein the portions behind the unit (for example, an extension or housing) can be seen through the transparent lens parts 24b.

Figure 11:
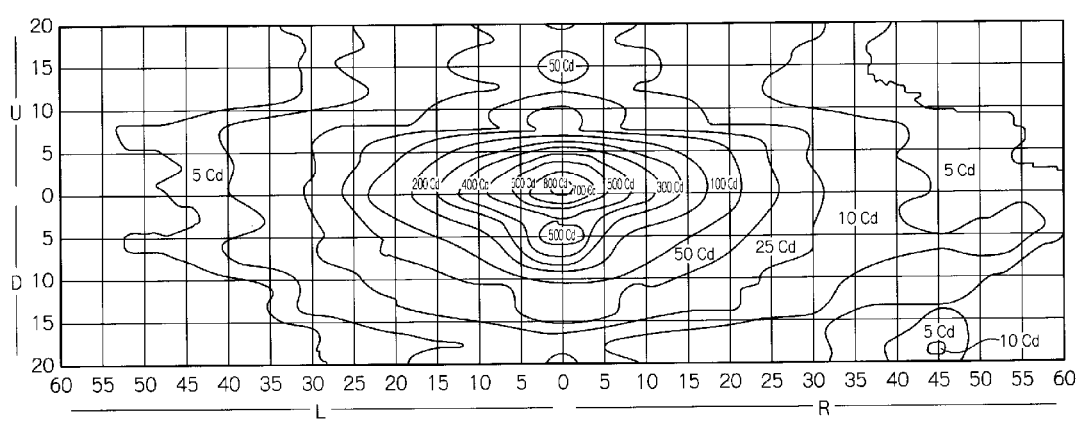
FIG. 11 is a diagram illustrating an exemplary light distribution pattern P1 formed by the vehicle light 100 of FIG. 10.

Further, in the aforementioned configuration, the vehicle light 100 can form a predetermined light distribution pattern P1 (see FIG. 11) which satisfies the luminous intensity level regulated by a certain traffic law. This can be achieved through light rays that are emitted from each vehicle light unit 10 (the light rays Ray 3 whose optical paths have been changed by the total reflection surfaces 24a1 to 24a3 and which are output as controlled light rays from the regions of the surfaces of the fourth lens parts 24 in which the lens cut parts 24c are formed). It should be noted that even when irradiation light of the vehicle light 100 permeates through an outer lens, and 15% thereof is lost, it is still possible to realize light utilization efficiency of approximately 50%.

Thus, the vehicle light 100 with the aforementioned configuration can form a predetermined light distribution pattern which satisfies the luminous intensity level regulated by a certain law, while also realizing a novel appearance.

Figure 12:
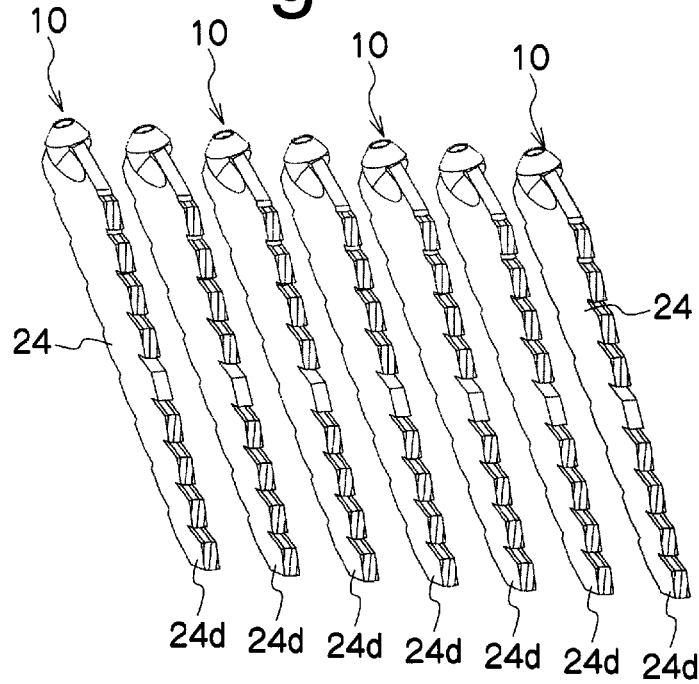
FIG. 12 is a perspective view of a modified example of the vehicle light 100 of FIG. 10.
Figure 13:
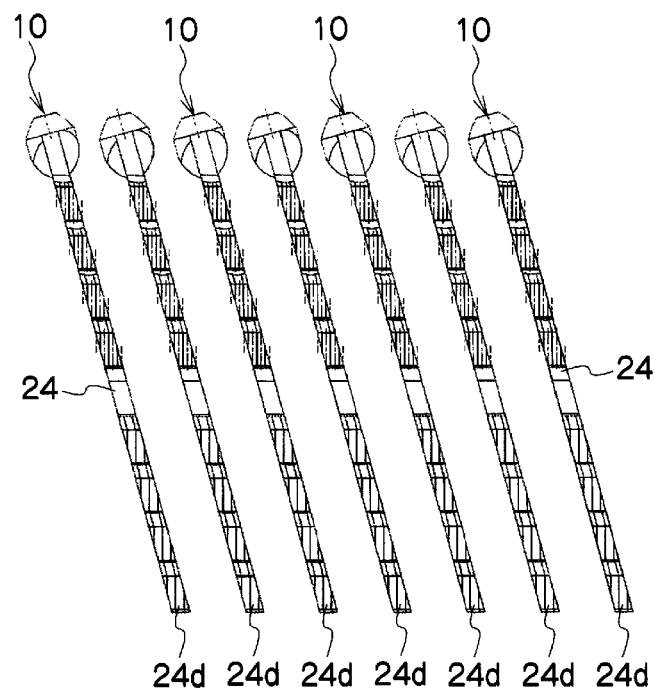
FIG. 13 is a front view of the modified example of FIG. 12.

It should also be noted that, as shown in FIGS. 12 and 13, the plurality of vehicle light units 10 can be configured such that the fourth lens parts 24 each can have the lens cut parts on a narrow side surface and the total reflection surfaces on the opposite narrow side surface while the vehicle light units 10 are each disposed along a predetermined line (for example, a vehicle body line that goes around from the vehicle rear end right side or left side along the right side surface or left side surface) so that the end surfaces 24d of the fourth lens parts 24 face the same direction.

A vehicle light 200 configured using a plurality of vehicle light units 10 will now be described.

Figure 14:
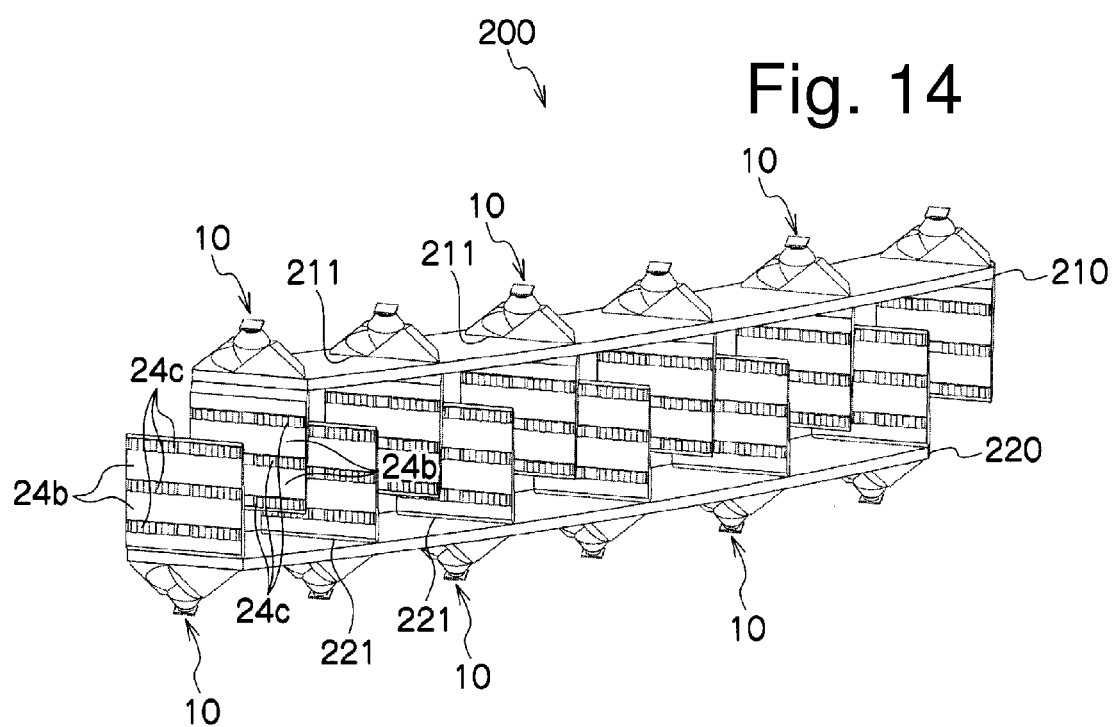
FIG. 14 is a perspective view illustrating a vehicle light 200 configured to utilize the vehicle light units 10 of FIGS. 2 to 4.
Figure 15:
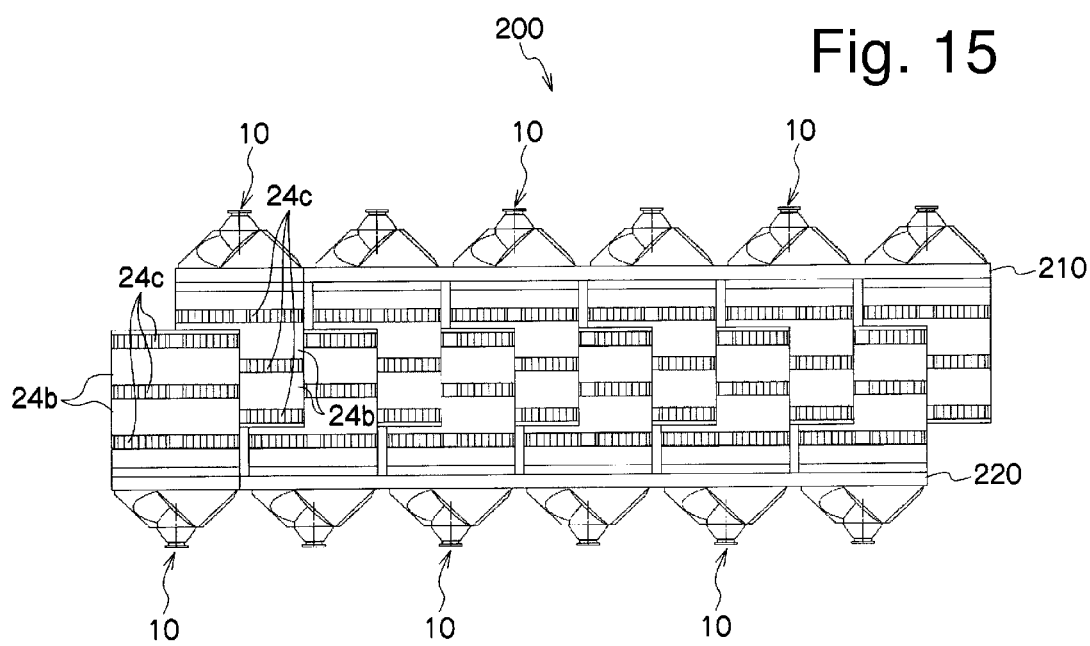
FIG. 15 is a front view illustrating the vehicle light 200 of FIG. 14.

The vehicle light 200 of the second example configuration, as shown in FIGS. 14 and 15, can include: a plurality of vehicle light units 10 which are disposed along an upper line (for example, a vehicle body line that goes around from the vehicle rear end right side or left side along the right side surface or left side surface), and in which the surfaces of the fourth lens parts 24 (the surfaces in which lens cut parts 24c are formed) face the same direction, the fourth lens parts 24 extending downward; a support member 210 to support the plurality of vehicle light units 10 disposed along the upper line; a plurality of vehicle light units 10 which are disposed along a lower line (for example, a vehicle body line that goes around from the vehicle rear end right side or left side along the right side surface or left side surface), and in which the surfaces of the fourth lens parts 24 (the surfaces in which the lens cut parts 24c are formed) face the same direction, the fourth lens part 24 extending upward; and a support member 220 to support the plurality of vehicle light units 10 disposed along the lower line.

The plurality of vehicle light units 10 disposed along the upper line can be, for example, supported in a state wherein the vehicle light units 10 are inserted in rectangular openings 111 (see FIG. 14) formed in the support member 210, and in which the fourth lens units 24 project from the lower surface of the support member 210. Also, the plurality of vehicle light units 10 disposed along the lower line can be supported in a state wherein the vehicle light units 10 are inserted in rectangular openings 221 (see FIG. 14) formed in the support member 220, and in which the fourth lens units 24 project from the upper surface of the support member 220.

As shown in FIG. 15, the first support member 210 and the second support member 220 can be disposed in parallel with a fixed interval therebetween, so that at least some of the regions, in which the lens cut parts 24c are formed, of the fourth lens parts 24 in the vehicle light units 10 disposed along the lower line are positioned at the rear of the transparent lens parts 24b of the fourth lens parts 24 in the vehicle light units 10 disposed along the upper line.

In the aforementioned configuration, the vehicle light 200 can have a novel appearance (layered light emission), wherein the regions of a rear-side vehicle light unit 10 which is positioned on the rear side of a front-side vehicle light unit 10 and in which the lens cut parts 24c are formed (in other words, the regions from which the light rays Ray 3, the optical path thereof having been changed by the total reflection surfaces 24a1 to 24a3, are output and emitted) can be seen through the transparent lens parts 24b of the front-side vehicle light unit 10.

Further, in the aforementioned configuration, the vehicle light 200 can have a novel appearance that has a sense of depth and spatiality, wherein the regions of the fourth lens parts 24 in which the lens cut parts 24c are formed (in other words, the regions from which the light rays Ray 3, the optical path thereof having been changed by the total reflection surfaces 24a1 to 24a3, are output and emitted) are evenly distributed.

Further, in the aforementioned configuration, the vehicle light 200 can form a predetermined light distribution pattern which satisfies the luminous intensity level regulated by a certain law, through light rays that are emitted from each vehicle light unit 10 (the light rays Ray 3 whose optical path has been changed by the total reflection surfaces 24a1 to 24a3 and which are output as controlled light rays from the regions of the surfaces of the fourth lens parts 24 in which the lens cut parts 24c are formed). It should be noted that, since the light rays Ray 3, which are output as controlled light from the regions of the surfaces of the fourth lens parts 24 in which the lens cut parts 24c are formed, can pass through the transparent lens part 24b, there is almost no effect on light distribution.

Thus, in the aforementioned configuration, the vehicle light 200 can form a predetermined light distribution pattern which satisfies the luminous intensity level required by a certain law, while also realizing a novel appearance (layered light emission).

Figure 16:
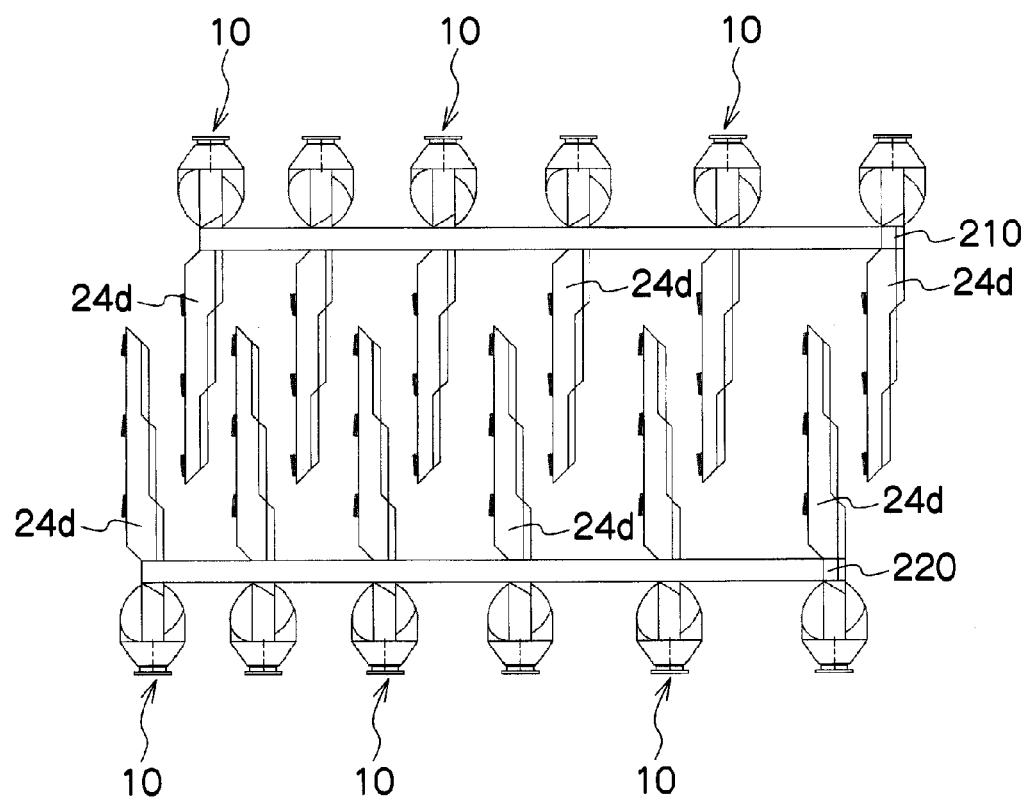
FIG. 16 is a front view of a modified example of the vehicle light 200 of FIG. 14.

It should be noted that, as shown in FIG. 16, the plurality of vehicle light units 10 can be disposed along a predetermined line (for example, a vehicle body line that goes around from the vehicle rear end right side or left side along the right side surface or left side surface) while the end surfaces 24d of the fourth lens parts 24 face the same direction A description will now be given of a vehicle light 500.

Figure 17:
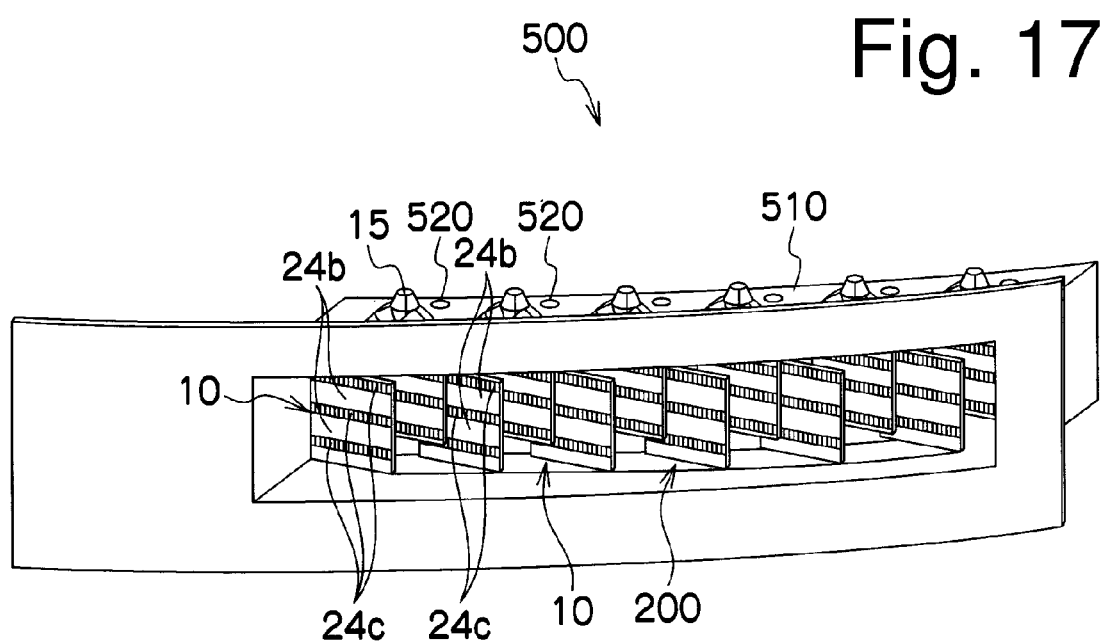
FIG. 17 is a perspective view illustrating a vehicle light 500 configured to utilize the vehicle light units 10 of FIGS. 2 to 4.

The vehicle light 500 of the third example configuration, as shown in FIG. 17, can include: a box-shaped reflector 510 which is surrounded by walls (each having been subjected to mirror surface processing) on at least bottom, left, right and rear surfaces thereof, and which has an opening formed in the front surface thereof; the vehicle light 200 disposed within the reflector 510; and an additional light source 520 or the like (for example, an LED light source) for indirect lighting within the reflector 520.

In the aforementioned configuration, the vehicle light 500 can have a novel appearance and a high quality feel not heretofore seen in conventional vehicle lights, wherein light is emitted in a state as if the regions where lens cut parts 24c are formed are suspended in midair, while the soft indirect light can be illuminated on the rear side of the vehicle light 200 inside the box-shaped reflector 510.

In the aforementioned configuration, the vehicle light 500 can have a novel appearance wherein the reflector 510 on the rear side of the vehicle light 500 is visible through the transparent lens parts 24b when not being lit, while the reflector 510 can be seen as if it emits light when being lit (the light emitting points appear in positions that are shifted forward, backward, leftward, rightward, upward, and downward with respect to each other).

Next, a description will be given of a vehicle light 600.

Figure 18:
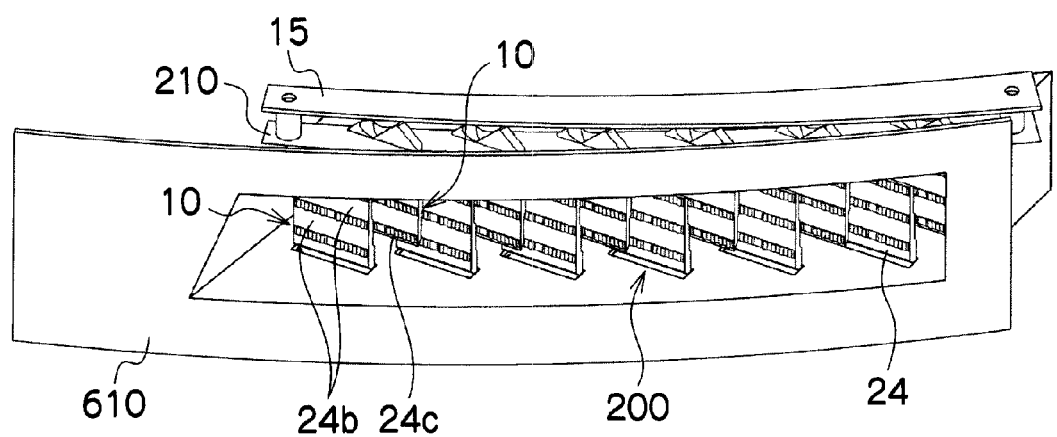
FIG. 18 is a perspective view illustrating a vehicle light 600 configured to utilize the vehicle light units 10 of FIGS. 2 to 4.
Figure 19:
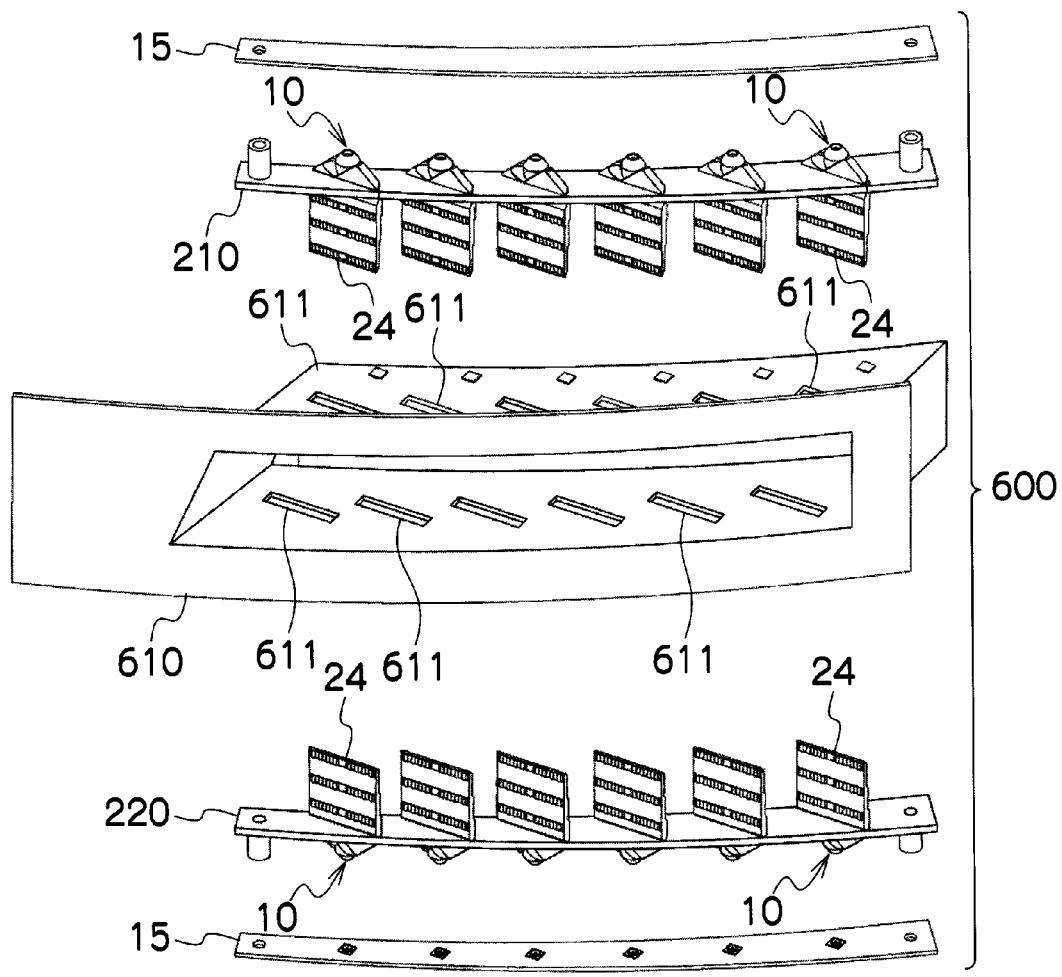
FIG. 19 is a front view illustrating the vehicle light 600 of FIG. 18.

The vehicle light 600 of the fourth example configuration, as shown in FIGS. 18 and 19, can include: a box-shaped housing 610 which has an opening formed in the front surface thereof; a plurality of vehicle light units 10 which are disposed along an upper line, and in which the surfaces of fourth lens parts 24 (the surfaces in which lens cut parts 24c are formed) face the same direction, the fourth lens parts 24 extending downward; and a plurality of vehicle light units 10 which are disposed along a lower line, and in which the surfaces of the fourth lens parts 24 (the surfaces in which the lens cut parts 24c are formed) face the same direction, the fourth lens part 24 extending upward.

As is shown in FIG. 19, on the upper surface of the housing 610, a plurality of openings 611 are formed in which the respective fourth lens parts 24 of the plurality of vehicle light units 10 disposed along the upper line are inserted. On the lower surface of the housing 610, a plurality of openings 611 are formed in which the respective fourth lens parts 24 of the plurality of vehicle light units 10 disposed along the lower line are inserted.

Namely, the respective fourth lens parts 24 of the plurality of vehicle light units 10 disposed along the upper line can be inserted in the plurality of openings 611 formed on the upper surface of the housing 610 and project into the housing 610 (see FIG. 18).

Furthermore, the respective fourth lens parts 24 of the plurality of vehicle light units 10 disposed along the lower line can be inserted in the plurality of openings 611 formed on the lower surface of the housing 610 and project into the housing 610. Additionally, of the projecting fourth lens parts 24 along the lower line, at least some of the regions in which the lens cut parts 24c are formed are positioned at the rear of transparent lens parts 24b of the fourth lens parts 24 projecting into the housing 610 inserted in the plurality of openings 611 formed on the upper surface of the housing 610 (see FIGS. 18 and 15).

In the aforementioned configuration, since the LED light sources 15 and the like components except for the fourth lens parts 24 can be covered with the housing 610, the LED light sources 15 are not directly observed from outside.

In addition, in the aforementioned configuration, the vehicle light 600 can have a novel appearance (layered light emission), wherein within the housing 610 the regions of a rear-side vehicle light unit 10 which is positioned on the rear side of a front-side vehicle light unit 10 and in which the lens cut parts 24c are formed (in other words, the regions from which the light rays Ray 3, the optical path thereof having been changed by total reflection surfaces 24a1 to 24a3, are output and emitted) can be seen through the transparent lens parts 24b of the front-side vehicle light 10.

Further, in the aforementioned configuration, the vehicle light 600 can have a novel appearance that has a sense of depth and spatiality, wherein the regions of the fourth lens parts 24 in which the lens cut parts 24*c* are formed (in other words, the regions from which the light rays Ray 3, the optical path thereof having been changed by the total reflection surfaces 24*a*1 to 24*a*3, are output and emitted) are evenly distributed.

Further, in the aforementioned configuration, the vehicle light 600 can form a predetermined light distribution pattern which satisfies the luminous intensity level required by a certain law, by means of light rays that are emitted from each vehicle light unit 10 (the light rays Ray 3 whose optical path has been changed by the total reflection surfaces 24*a*1 to 24*a*3 and which are output as controlled light rays from the regions of the surfaces of the fourth lens parts 24 in which the lens cut parts 24*c* are formed). It should be noted that, since the light rays Ray 3, which are output as controlled light rays from the regions of the surfaces of the fourth lens parts 24 in which the lens cut parts 24*c* are formed, can pass through the transparent lens part 24*b*, there is almost no effect on light distribution.

Thus, in the aforementioned configuration, the vehicle light 600 can form a predetermined light distribution pattern which satisfies the luminous intensity level required by a certain law, while also realizing a novel appearance (layered light emission) and without the LED light sources 15 and the like components being directly observed from outside.

Various vehicle lights can be configured by appropriately combining the vehicle lights 100 to 600 of the aforementioned configurations.

For example, a vehicle light can be configured to include the vehicle light 100 disposed on the front side and the vehicle light 300 or 400 on the rear side to provide a three-dimensional novel appearance wherein light guiding lenses are vertically and laterally combined.

Furthermore, it is possible to cause light to be emitted in a layered manner as in the vehicle light 200 (see FIGS. 14 and 15). Accordingly, various new appearances can be created by combining several colored lights for various purposes. For example, if the vehicle light is for use in tail stop lamps, the same red colored lights can be combined and switched for each light emission surfaces. Furthermore, when the vehicle light is for use in front lamps, a vehicle light unit serving as an amber turn signal lamp and a vehicle light unit serving as a white daytime running lamp can be combined. When the vehicle light is for use in rear lamps, a vehicle light unit serving as a red tail lamp, a vehicle light unit serving as an amber turn single lamp, and a vehicle light unit serving as a white backup lamp can be combined. The combinations can provide various novel appearances.

As explained thus far, in the vehicle light unit 10 in the above exemplary embodiment, due to the action of the first lens part 21, the second lens part 22, and the first to fourth total reflection surfaces 23*a* to 23*d*, the LED light source 15 can be converted into a linear light emitting state (the linear light emitting part can be configured by means of the converged light rays Ray 1 and Ray 2 traveling in the direction parallel to the optical axis AX and passing through the substantially entire area of a rectangular cross section A).

Furthermore, in the vehicle light unit 10 in the above exemplary embodiment, due to the action of the second lens part 22, the light rays Ray 2 in the wide angle direction with respect to the optical axis AX from among the light rays emitted from the LED light source 15 can be effectively utilized. As a result, light utilization efficiency can be improved when compared with conventional vehicle lights.

Furthermore, unlike conventional vehicle lights which are configured to use mirrors that have been subjected to mirror surface processing through sputtering or the like, the vehicle light unit 10 in the above exemplary embodiment can be configured so that the light rays travelling within the lens body can be reflected twice by the first to fourth total reflection surfaces 23*a* to 23*d* with internal reflection (total reflection). Thus, light utilization efficiency can be further improved when compared with conventional vehicle lights.

Moreover, the vehicle light unit 10 in the above exemplary embodiment can be configured to convert light rays emitted from the LED light source 15 into light rays Ray 3 traveling in the direction parallel to the optical axis AX and passing through the substantially entire area of a rectangular cross section (light rays travelling in the same direction for easier control) due to the action of the first lens part 21, the second lens part 22, and the first to fourth total reflection surfaces 23*a* to 23*d*.

Furthermore, the vehicle light unit 10 in the above exemplary embodiment can be configured to emit light rays in a layered manner without making the light source directly visible from a light emitting surface (such as the surface of the fourth lens part 24).

Further, the vehicle light unit 10 in the above exemplary embodiment can be configured to have an original appearance with transparency wherein the reflection surface on the rear side is visible through the transparent lens part 24*b* when not being lit, and the space within the vehicle light can be viewed as if it emits light when being lit (the light emitting points are present in positions that are shifted forward, backward, leftward, rightward, upward, and downward).

Further, the vehicle light unit 10 in the above exemplary embodiment can be configured to provide an original appearance in which light of a fine-width not heretofore seen in conventional vehicle lights can be emitted.

Further, the vehicle light unit 10 in the above exemplary embodiment can be configured to suppress cost since the lens body 20 and the like parts can be formed to be relatively thin.

Further, the vehicle light unit 10 in the above exemplary embodiment can be configured to effectively utilize total reflection surfaces as the inner surfaces of lenses such as the fourth lens part 24 and other light guide lenses. Since there is no reflection loss associated with the conventional vehicle lights using mirrors which have been subjected to mirror surface processing by means of sputtering or the like, light emission of a fine-width with high efficiency can be realized.

The vehicle light unit 10 in the above exemplary embodiment can be configured to create a lamp having a plurality of functions derived from one light emitting surface (such as the surface of the fourth lens part 24), and accordingly, a vehicle light having a compact body with a new appearance can be provided.

Further, according to the vehicle light unit 10, it is possible to configure a vehicle light having a new appearance, since indirect lighting can be provided from the rear surface of the vehicle light unit 10.

It should be noted that it in certain applications it is desirable that the LED light source 15, used in the vehicle lights 100 to 600 of the aforementioned configurations, be mounted on a common substrate, as is shown in FIG. 19.

Furthermore, in the vehicle lights 100 to 200 of the aforementioned configurations, the fourth lens part 24 can be made of a transparent body. Therefore, a box-shaped extension or a housing having reflection surfaces may be disposed on the rear surface of the fourth lens part 24, whereby a transparent appearance can be created such that nothing seems to be present inside the extension or housing when not being lit, while numerous light emitting points appear in the space within the extension or housing when being lit. Thus, a three-dimensional, midair light emission appearance can be realized. Further, it is possible to dispose another lighting fixture on the rear surface of the fourth lens part 24 (see FIG. 17).

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A vehicle light unit comprising:
    an LED light source having an optical axis; and
    a solid lens body including a first lens part, a second lens part, and a third lens part, wherein
    the first lens part is a converging lens part disposed in front of the LED light source and on the optical axis thereof, the converging lens part configured to collimate light rays emitted from the LED light source in a narrow angle direction with respect to the optical axis so that the light rays are collimated with respect to the optical axis,
    the second lens part is a second converging lens part disposed on an outside of the first lens part, the second converging lens part configured to collimate light rays emitted from the LED light source in a wide angle direction with respect to the optical axis so that the light rays are collimated with respect to the optical axis,
    the third lens part is disposed in front of the first lens part and the second lens part so that the light rays converged by and traveling through the first lens part and the light rays converged by and traveling through the second lens part are incident to the third lens part,
    the third lens part having a rectangular cross section taken along a plane perpendicular to the optical axis, wherein a height of the rectangular cross section is set to a dimension the same as a diameter of the first lens part and a width of the rectangular cross section is set larger than a diameter of the second lens part, and the third lens part further having a first total reflection surface, a second total reflection surface, a third total reflection surface, and a fourth total reflection surface,
    the rectangular cross section extending as a whole in one direction, the rectangular cross section including: a center region where the light rays that are converged by and travel through the first lens part pass through; two first regions disposed on both sides of the center region where some of the light rays from among the light rays that are converged by and travel through the second lens part pass through; and two second regions disposed outside of the two first regions,
    the first total reflection surface is disposed at an attitude wherein the first total reflection surface is inclined with respect to the optical axis so that the light rays, which travel toward the outside of one long side of the rectangular cross section and which are from among the light rays that are converged by and travel through the second lens part, are incident on the first total reflection surface and the incident light rays are reflected sideward,
    the second total reflection surface is disposed at an attitude wherein the second total reflection surface is inclined with respect to the optical axis so that the reflected light rays from the first total reflection surface are incident on the second total reflection surface, and the incident light rays are reflected by the second total reflection surface in a direction parallel to the optical axis to pass through one of the second regions,
    the third total reflection surface is disposed at an attitude wherein the third total reflection surface is inclined with respect to the optical axis so that the light rays, which travel toward the outside of an other long side of the rectangular cross section and which are from among the light rays that are converged by and travel through the second lens part, are incident to the third total reflection surface, and
    the fourth total reflection surface is disposed at an attitude wherein the fourth total reflection surface is inclined with respect to the optical axis so that the reflected light rays from the third total reflection surface are incident to the fourth total reflection surface, and the incident light rays are reflected in a direction parallel to the optical axis, and pass through an other of the second regions.

2. The vehicle light unit according to claim 1, wherein:
    the lens body further includes a fourth lens part disposed so that the light rays passing through the rectangular cross section are incident on the fourth lens part; and
    in a region of the fourth lens part where the light rays passing through the rectangular cross section and traveling through the fourth lens part are output, a lens cut part is formed to control the light rays traveling through the fourth lens part so that a predetermined light distribution pattern is formed.

3. The vehicle light unit according to claim 2, wherein:
    the fourth lens part is configured by extending the rectangular cross section along the optical axis to be formed as a light-guiding lens having a flat plate shape;
    the fourth lens part is configured to include a front surface disposed in parallel with the optical axis, a rear surface disposed opposite to the front surface, a plurality of total reflection surfaces formed in the rear surface along the optical axis, and a transparent lens part disposed between adjacent ones of the plurality of the total reflection surfaces;
    the plurality of total reflection surfaces are disposed at an attitude wherein the total reflection surfaces are inclined at an angle of approximately 45° with respect to the optical axis so that part of the light rays passing through the rectangular cross section and traveling through the fourth lens part are caused to be incident to the total reflection surfaces, and the incident light rays are caused to be reflected toward the surface of the fourth lens part, and
    in a region of the fourth lens part where the light rays reflected from the plurality of total reflection surfaces are output, the lens cut part is formed to control the light rays traveling through the fourth lens part so that the predetermined light distribution pattern is formed.

4. The vehicle light unit according to claim 3, wherein surface regions corresponding to the plurality of total reflection surfaces are subjected to mirror surface processing.

5. A vehicle light comprising a plurality of the vehicle light units according to claim 4, wherein the fourth lens parts have respective surfaces facing a same direction and are disposed along a predetermined line.

6. A vehicle light comprising:
    a plurality of the vehicle light units according to claim 4, the plurality of vehicle light units being disposed along an upper line and a lower line, with the surfaces of the fourth lens parts facing a same direction, the fourth lens parts disposed along the upper line extending downward and the fourth lens parts disposed along the lower line extending upward, wherein at least part of the regions, in which the lens cut parts are formed, of the fourth lens parts of the vehicle light units disposed along the lower line is positioned at the rear of transparent lens parts of the fourth lens parts of the vehicle light units disposed along the upper line.

7. A vehicle light comprising:

a box-shaped housing having an opening formed in a front surface thereof; and a plurality of the vehicle light units according to claim 4, the plurality of vehicle light units being disposed along an upper line and along a lower line, with the surfaces of the fourth lens parts facing a same direction, the fourth lens parts disposed along the upper line extending downward and the fourth lens parts disposed along the lower line extending upward, on an upper surface of the housing, a plurality of openings are formed in which the respective fourth lens parts of the plurality of vehicle light units disposed along the upper line are inserted and project into the housing, on a lower surface of the housing, a plurality of openings are formed in which the respective fourth lens parts of the plurality of vehicle light units disposed along the lower line are inserted and project into the housing, and at least part of the regions, in which the lens cut parts are formed, of the projecting fourth lens parts along the lower line is positioned at the rear of transparent lens parts of the fourth lens parts projecting into the housing inserted in the plurality of openings formed on the upper surface of the housing.

8. A vehicle light comprising a plurality of the vehicle light units according to claim 3, wherein the fourth lens parts have respective surfaces facing a same direction and are disposed along a predetermined line.

9. A vehicle light comprising:

a box-shaped reflector having an opening in a front surface thereof;

the vehicle light according to claim 8, the vehicle light disposed inside the box-shaped reflector; and an additional light source provided inside the box-shaped reflector.

10. A vehicle light comprising:

a plurality of the vehicle light units according to claim 3, the plurality of vehicle light units being disposed along an upper line and a lower line, with the surfaces of the fourth lens parts facing a same direction, the fourth lens parts disposed along the upper line extending downward and the fourth lens parts disposed along the lower line extending upward, wherein at least part of the regions, in which the lens cut parts are formed, of the fourth lens parts of the vehicle light units disposed along the lower line is positioned at the rear of transparent lens parts of the fourth lens parts of the vehicle light units disposed along the upper line.

11. A vehicle light comprising:

a box-shaped reflector having an opening in a front surface thereof;

the vehicle light according to claim 6, the vehicle light disposed inside the box-shaped reflector; and an additional light source provided inside the box-shaped reflector.

12. A vehicle light comprising:

a box-shaped housing having an opening formed in a front surface thereof; and a plurality of the vehicle light units according to claim 3, the plurality of vehicle light units being disposed along an upper line and along a lower line, with the surfaces of the fourth lens parts facing a same direction, the fourth lens parts disposed along the upper line extending downward and the fourth lens parts disposed along the lower line extending upward, on an upper surface of the housing, a plurality of openings are formed in which the respective fourth lens parts of the plurality of vehicle light units disposed along the upper line are inserted and project into the housing, on a lower surface of the housing, a plurality of openings are formed in which the respective fourth lens parts of the plurality of vehicle light units disposed along the lower line are inserted and project into the housing, and at least part of the regions, in which the lens cut parts are formed, of the projecting fourth lens parts along the lower line is positioned at the rear of transparent lens parts of the fourth lens parts projecting into the housing inserted in the plurality of openings formed on the upper surface of the housing.

* * * * *